United States Patent
Stroud (10) Patent No.: US 7,894,948 B2
(45) Date of Patent: Feb. 22, 2011

(54) SYSTEMS AND METHODS FOR COORDINATION OF ENTITIES AND/OR COMMUNICATING LOCATION INFORMATION

(75) Inventor: Ken A. Stroud, Greenville, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 782 days.

(21) Appl. No.: 11/982,436

(22) Filed: Nov. 1, 2007

(65) Prior Publication Data

US 2009/0118875 A1     May 7, 2009

(51) Int. Cl.
   G08G 7/02    (2006.01)
   G08G 9/02    (2006.01)
   G08G 5/04    (2006.01)

(52) U.S. Cl. ............................ 701/3; 701/11; 701/116; 701/301; 701/120

(58) Field of Classification Search ............ 701/3
   See application file for complete search history.

(56) References Cited

U.S. PATENT DOCUMENTS

| | | | |
|---|---|---|---|
| 6,072,433 A | 6/2000 | Young et al. | |
| 6,407,703 B1 | 6/2002 | Minter et al. | |
| 6,459,411 B2 * | 10/2002 | Frazier et al. | 342/455 |
| 6,483,454 B1 | 11/2002 | Torre et al. | |
| 6,643,572 B2 | 11/2003 | Kohge et al. | |
| 6,911,936 B2 | 6/2005 | Stayton et al. | |
| 6,926,233 B1 | 8/2005 | Corcoran, III | |
| 7,295,925 B2 * | 11/2007 | Breed et al. | 701/301 |
| 7,629,899 B2 * | 12/2009 | Breed | 340/903 |
| 7,791,503 B2 * | 9/2010 | Breed et al. | 340/993 |
| 2005/0230563 A1 | 10/2005 | Corcoran, III | |
| 2007/0152804 A1 * | 7/2007 | Breed et al. | 340/435 |
| 2008/0040023 A1 * | 2/2008 | Breed et al. | 701/117 |

* cited by examiner

*Primary Examiner*—Thomas G Black
*Assistant Examiner*—Shelley Chen
(74) *Attorney, Agent, or Firm*—O'Keefe, Egan, Peterman & Enders, LLP (57) ABSTRACT

Systems and methods that may be employed to communicate location information between two or more aerial vehicles or other types of vehicles or other entities, and/or that may be used to facilitate coordinated operations of two or more such entities. In one example, an aerial vehicle may be kept aware of one or more location (e.g., longitude, latitude, etc.) and/or flight characteristics (e.g., altitude, directional heading, airspeed, attitude, etc.) of one or more other adjacent aerial vehicles, and each such aerial vehicle may use that location information to adjust its flight path to maintain a safe sphere of empty airspace around itself.

25 Claims, 4 Drawing Sheets

SYSTEMS AND METHODS FOR COORDINATION OF ENTITIES AND/OR COMMUNICATING LOCATION INFORMATION

FIELD OF THE INVENTION

This invention relates generally to location, and more particularly, to coordination of entities and/or communication of location information.

BACKGROUND OF THE INVENTION

In flight operation of a covey or formation of multiple unmanned aerial vehicles (UAVs) flying in close proximity presents significant potential for mid air collisions between two or more of the UAVs. It is expected that any such mid air collisions will prove fatal to a least one, and possibly all, of the UAVs involved in such a collision. UAVs are typically controlled by human operators and operate with a ground system that is aware of their position. Maintaining a sphere of free (or empty) airspace around each UAV operating in a small covey or formation presents a major challenge to a human operator, and can become nearly impossible for a human operator when the covey size increases in number and/or when individual UAVs of the covey work in very close proximity. As the UAV covey size increases, the number of human operators controlling the UAVs may be increased. Although this may present an initial solution to successful operation of larger UAV coveys, adding more human operators may become impractical as the covey size grows further in number.

Pre-mission planning is focused on reducing the possibility of aerial collisions among formations of UAVs, and altitude separation and or location segmentation among the group of UAVs may be employed to further reduce collision possibilities. Image processing is being developed to allow an operator of a given UAV to be able to "see" other UAVs in the formation from the perspective of the given UAV.

SUMMARY OF THE INVENTION

Disclosed herein are systems and methods that may be employed in one embodiment to communicate geographic location and/or directional path characteristic information between two or more entities (e.g., aerial vehicles), and/or to facilitate coordinated operations (e.g., coordinated flight operations) of two or more entities operating in close proximity to each other. The disclosed systems and methods may be so implemented in any environment in which GPS satellite signal transmissions may be received. Using the disclosed systems and methods, each entity may be kept aware of geographic location information (e.g., longitude, latitude, etc.) and/or directional path characteristic information (e.g., altitude, depth, directional heading, airspeed, groundspeed, attitude, etc.) of one or more other adjacent entities, and in one exemplary embodiment each such entity may use that information to adjust its directional path to maintain a safe area around itself.

When implemented to coordinate operations or aerial vehicles, each aerial vehicle may be kept aware of geographic location information (e.g., longitude, latitude, etc.) and/or flight characteristic information (e.g., altitude, directional heading, airspeed, attitude, etc.) of one or more other adjacent aerial vehicles, and each such aerial vehicle may use that geographic location information to adjust its flight path to maintain a safe sphere of empty airspace around itself. Advantageously, the disclosed systems and methods may be implemented without need for a ground system and/or human controller to micro-manage the group of aerial vehicles, and/ or without the need for the aerial vehicles to participate in a local radio sub-net. In one embodiment, the disclosed systems and methods may be integrated into commercial unmanned aircraft systems (e.g., used for aerial news report coverage, aerial traffic monitoring, aerial coverage of sports events, etc.) in a way that contributes to meeting FAA sense and avoidance requirements.

In one exemplary embodiment, the disclosed systems and methods may be implemented in a stand-alone manner to allow a group of two or more aerial vehicles (e.g., UAVs) to fly in an autonomous covey or formation. In such an embodiment, a group of aerial vehicles may be made aware of other aerial vehicles operating within close proximity and in a manner that substantially reduces or eliminates the potential for mid-air collisions between two or more of the aerial vehicles. Each of the aerial vehicles may be made aware of other aerial vehicles in its immediate airspace and, when appropriate, to take evasive action to avoid collision with another aerial vehicle in the group. A rule-based flight coordination protocol may be implemented (e.g., by computer processor/s or other type/s of suitable processing component/s on each of the aerial vehicles) to provide effective de-confliction of flight paths on a real-time or near real-time basis. Such a rule-based flight coordination protocol may be consistent and simple, e.g., to cause each aerial vehicle to turn right when approaching another aerial vehicle in a head-on direction so that a collision is avoided between the two aerial vehicles.

In one exemplary embodiment, the disclosed systems and methods may be implemented utilizing a short range and low power radio system coupled with a time synchronous source to provide a relatively small and light weight radio system for an aerial vehicle such as a UAV. The radio system may include a RF transmitter that is synchronized to global positioning system (GPS) information to encode latitude and longitude into a timing relationship of a pulsed RF signal that may be transmitted by the aerial vehicle and received and decoded by one or more other aerial vehicles in the local area, e.g., within a given covey or formation of aerial vehicles. GPS time synchronization may be employed to encode the aerial vehicle position data and, in one exemplary embodiment, relatively small-sized GPS equipment and smart radio transceiver equipment may be utilized to implement the disclosed systems and methods with small aerial vehicles.

The disclosed systems and methods may be implemented in one embodiment, for example, in a standalone manner to provide flight inputs to an aerial vehicle autopilot in order to make adjustment in real time to the aerial vehicle flight path, e.g., the flight inputs may be input in a manner that does not alter existing waypoints but rather alters the trajectory vector a aerial vehicle uses to obtain a waypoint. The disclosed systems and methods may also be advantageously implemented in one exemplary embodiment to allow each aerial vehicle of a group (i.e., covey) of multiple aerial vehicles to transmit a pulsed RF signal (with timing-encoded latitude and longitude values) to the other aerial vehicles of the group on the same RF signal carrier frequency used by the other aerial vehicles to transmit similar pulsed RF signals. This capability to use the same RF signal carrier frequency for all aerial vehicles allows geographic location information to be exchanged between members of the group of aerial vehicles in a manner that is very efficient in the frequency domain.

In one respect disclosed herein is a method for coordinating operations of a group of two or more entities, the method including: communicating location information derived from global positioning system (GPS) data corresponding to the geographic location of a first one of the entities of the group to at least a second one of the aerial vehicles of the group by transmitting a RF signal pulse from the first aerial vehicle to the second aerial vehicle at a time delayed relative to a time of a provided synchronized clock pulse, the value of the time delay being based on the location information; and controlling a directional path of at least the second one of the entities of the group based at least partially on the communicated location information corresponding to the geographic location of the first one of the entities of the group relative to the geographic location of the second one of the entities of the group.

In another respect, disclosed herein is a method of communicating location information, including: obtaining location information from global positioning system (GPS) data, the location information including at least one value corresponding to a geographic location; providing a first synchronized clock pulse; and transmitting a RF signal pulse at a time delayed relative to a time the first synchronized clock pulse is received, the value of the time delay being based on the at least one value of the location information.

In another respect, disclosed herein is a system for communicating location information, including: at least one processing component coupled to a transmitter, the transmitter being configured to transmit a first RF signal pulse. The at least one processing component may be configured to: obtain first location information from global positioning system (GPS) data, the first location information including at least one value corresponding to a first geographic location, determine a time delay value based on the at least one value of the location information corresponding to the first geographic location, and provide a signal to the transmitter to cause transmission of the first RF signal pulse at a time delayed relative to a time that a first synchronized clock pulse is produced, the value of the time delay being based on the at least one value of the first location information corresponding to the first geographic location.

DESCRIPTION OF ILLUSTRATIVE EMBODIMENTS

Figure 1:
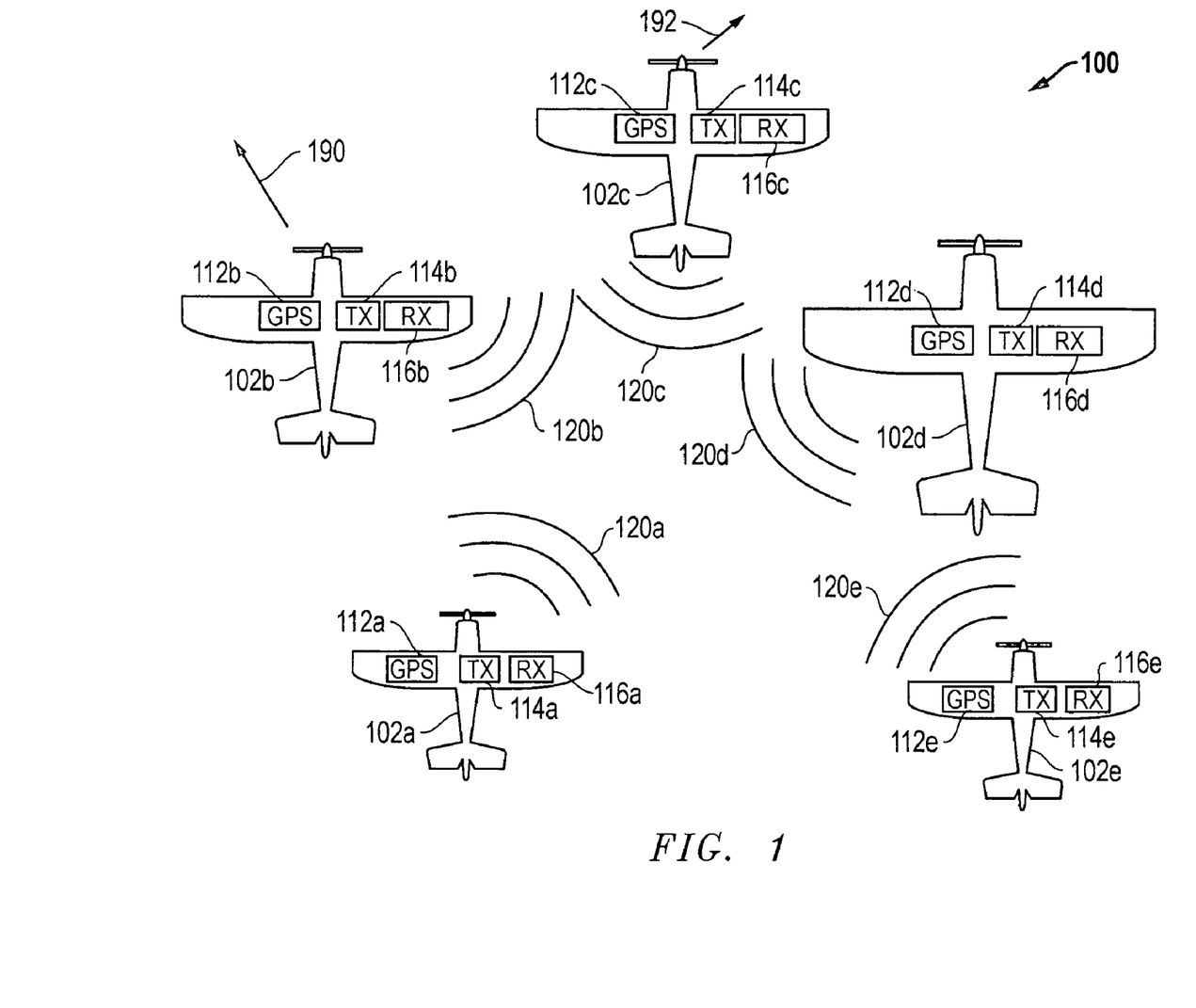
FIG. 1 is a simplified overhead view of a group of airborne aerial vehicles according to one exemplary embodiment of the disclosed systems and methods.

FIG. 1 is an overhead view of a group (i.e., covey) 100 of airborne aerial vehicles 102a to 102e, each of which is a UAV in this exemplary embodiment. In this exemplary embodiment, aerial vehicles 102a to 102e are shown flying with similar headings and at different altitudes (represented by the different apparent sizes of the aerial vehicles). Such a group configuration of aerial vehicles may be implemented, for example, to perform aerial surveillance (e.g., for traffic, weather, news, military, police or border surveillance purposes), airborne sample collection purposes, cargo transport purposes or for any other purpose that may be suitably performed by a group of aerial vehicles. It will be understood that aerial vehicles 102 of group 100 may be operating in a partially autonomous manner (e.g. with some external guidance or control provided by a ground or air-based human controller for operational and/or navigational purposes) or may be operating in a completely autonomous manner with no external guidance or control. Further, each of aerial vehicles 102 may be of any vehicle configuration that is suitable for airborne operation, e.g., fixed wing aircraft configuration, helicopter configuration, etc.). Moreover, although unmanned aerial vehicles are employed in the illustrated embodiment, it will be understood that the disclosed systems and methods may be implemented to facilitate coordinated flight operations of a group of aerial vehicles, one or more of which are manned by human flight crew and/or human passengers.

Figure 2:
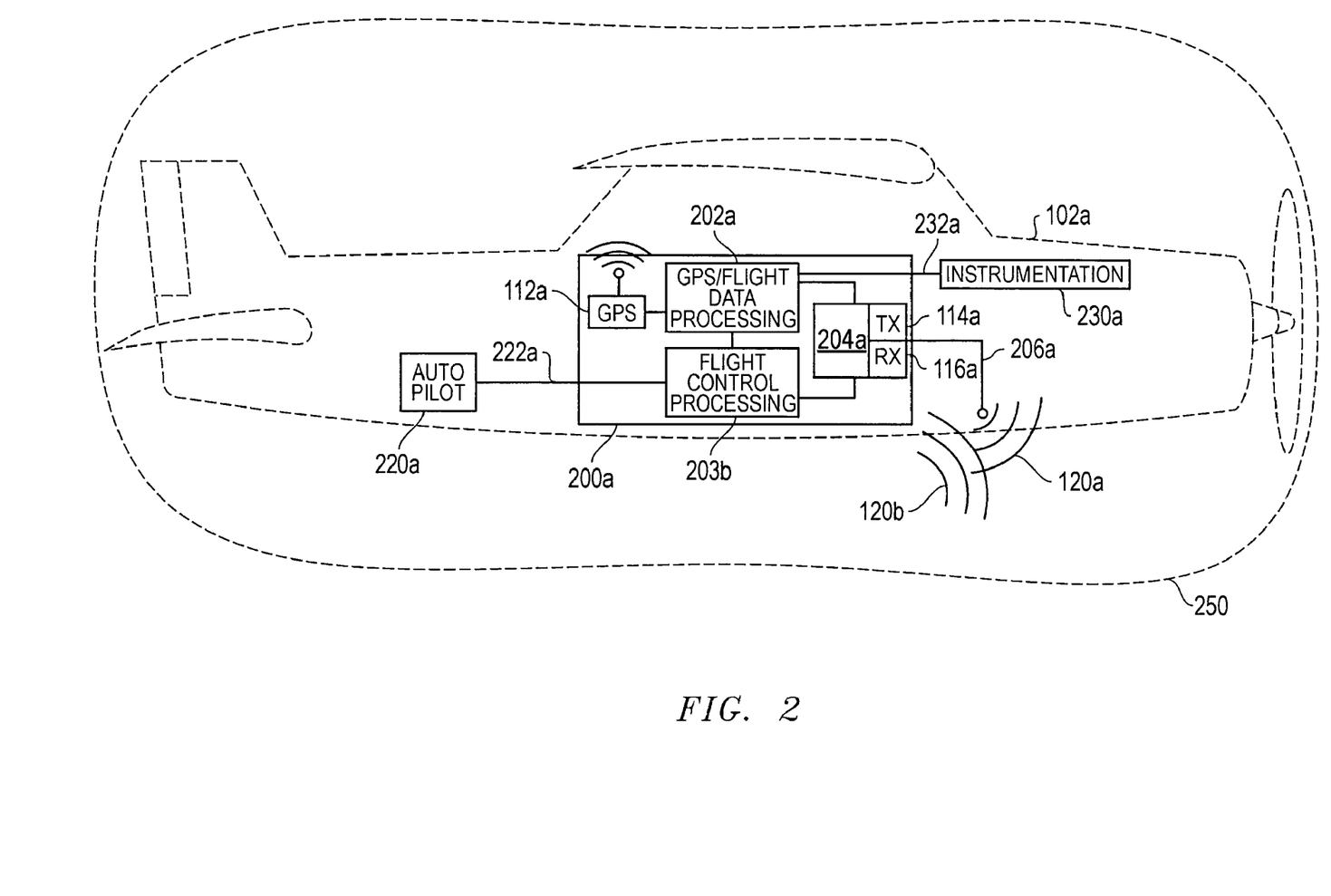
FIG. 2 is a simplified block diagram of an aerial vehicle according to one exemplary embodiment of the disclosed systems and methods.

As shown in FIG. 1, each of aerial vehicles 102a to 102e includes GPS signal receiver 112, RF transmitter 114 and RF receiver 116, each of which may be provided as separate components or may be integrated into a common component, e.g., RF transmitter and RF receiver functionalities may be implemented using a single RF transceiver component such as RF transceiver 204a of FIG. 2. In FIG. 1, RF transmitter 114 of each of aerial vehicles 102a to 102e is shown transmitting a respective RF signal 120 that is received by a respective RF receiver 116 of each of the other aerial vehicles 102a to 102e. As will be described further herein, the RF signal 120 transmitted by each given one of aerial vehicles 102a to 102e may be transmitted in a manner to communicate geographic location (e.g., longitude, latitude, etc.) and/or flight characteristics (e.g., altitude, directional heading, airspeed, attitude, etc.) of the given aerial vehicle 102 that is transmitting the particular RF signal 120. This transmitted geographic location and/or flight characteristic information may be based at least partially on GPS signal information received by the GPS signal receiver 112 of the given aerial vehicle 102 that is transmitting the particular RF signal 120.

In the embodiment of FIG. 1, each of the aerial vehicles 102 that receive the transmitted RF signal 120 from a given other one of aerial vehicles 102 is made aware of the real time geographic location and/or flight characteristic information of the given other aerial vehicle 102 as it is communicated as information contained in the received RF signal 120. Each of the receiving aerial vehicles 102 may then be configured to analyze this geographic location and/or flight characteristic information and, if appropriate, to take evasive action to avoid collision with the given other aerial vehicle 102 that transmitted the RF signal 120.

FIG. 2 shows one exemplary embodiment of an aerial vehicle 102a that includes a flight coordination system 200a coupled to RF antenna 206a. Not shown in FIG. 2 are other aerial vehicles 102 that may be flying together in a group 100 with aerial vehicle 102a in a manner as illustrated in FIG. 1. As shown, flight coordination system is configured to provide a RF signal 120a for transmission via antenna 206a to one or more other aerial vehicles of the same group 100, and to receive RF signals from at least one other aerial vehicle 102b of the same group 100 (e.g., illustrated here as single received RF signal 120b). In this embodiment, flight coordination system 200a includes GPS receiver 112a, GPS/flight data processing 202a, flight control processing 203a, and RF transceiver 204a (e.g., performing functions of RF transmitter 114a and RF receiver 116a of FIG. 1) that are operatively coupled together as shown.

In FIG. 2, flight coordination system 200a is also shown coupled to autopilot 220a that is configured to control flight characteristics of aerial vehicle 102a, e.g., by controlling throttle and actuating control surfaces such as ailerons, elevators, rudder, etc. of aerial vehicle 102a. As so configured, flight control processing 203a of flight coordination system 200a may provide flight control commands 222a to autopilot 220a that direct autopilot 220a to change one or more flight characteristics of aerial vehicle 102a (e.g., altitude, airspeed, attitude, directional heading, etc.) in response to geographic location and/or flight characteristics of aerial vehicle 102a (e.g., provided by GPS/flight data processing 202a) and geographic location and/or flight characteristics of at least one other aerial vehicle 102b (e.g., provided in received RF signal 102b). Flight coordination system 200a is further shown coupled to flight instrumentation 230a that is configured to measure and provide real time flight characteristic information 232a (e.g., altitude, airspeed, attitude, directional heading, etc.) of aerial vehicle 102a to GPS/flight data processing 202a of flight coordination system 200a.

In the exemplary embodiment of FIG. 2, GPS/flight data processing 202a may include one or more processing components (e.g., microprocessor/s, central processing units, ASICs, FPGAs, etc.) in any combination with memory, software, firmware, etc. that is suitably configured to receive GPS data (e.g., real time latitude, longitude, 1 pps GPS signal timing) from GPS receiver 112a and real time flight characteristic information 232a from flight instrumentation 230a, and to process this data in a manner as described elsewhere herein to produce geographic location and/or flight characteristic information of aerial vehicle 102a for transmittal by RF transceiver 204a and antenna 206a in RF signal 120a to other aerial vehicles of the same group 100. Flight control processing 203a may also include one or more processing components (e.g., microprocessor/s, central processing unit/s, ASIC/s, FPGA/s, etc.) in any combination with memory, software, firmware, etc. that is suitably configured to receive geographic location and/or flight characteristic information of another aerial vehicle 102b contained in RF signal 120b from antenna 206a and RF transceiver 204a and to receive geographic location and/or flight characteristic information of aerial vehicle 102a from GPS/flight data processing 202a and to produce flight control commands 222a to autopilot 220 based on this received geographic location and/or flight characteristic information of aerial vehicles 102a and 102b. Such flight control commands 222a may be provided, for example, to cause aerial vehicle 102a to take evasive action to avoid a collision with the other aerial vehicle 102b in a manner as described elsewhere herein.

In one embodiment of the disclosed systems and methods, the communication range (i.e., signal transmission and reception range) 250 of RF transceiver 204a of FIG. 2 may be selected to define the airspace in which aerial vehicle 102a is to be aware of its neighboring aerial vehicles in the same group 100. For example, a RF transceiver 204a may be selected to have a nominal range of about 500 feet where it is desired for aerial vehicle 102a to be aware of and avoid other aerial vehicles operating within 500 feet around aerial vehicle 102a, but not necessarily aerial vehicles 102 operating outside this communication range. In such an example, a safety sphere of empty airspace may be further selected to be maintained around aerial vehicle 102a that lies within or is smaller in volume than a sphere defined by the communication range. The value of communication range 250 may be selected, for example, to ensure capability of aerial vehicles 102 avoid collisions based given factors such as number of aerial vehicles 102 in the group 100, the airspeed of the aerial vehicles 102, the maneuverability of the aerial vehicles, size of aerial vehicles 102, etc. It will be understood that the value of communication range 250 may be selected to be greater than or less than about 500 feet as desired or needed to fit a given application, and in one embodiment smaller communication ranges may be achieved using RF attenuation or less efficient antennas.

As previously described, each of signals 120 includes geographic location and/or flight characteristic information for a given one of aerial vehicles 102. It will be understood that each signal 102 may only include as much geographic location information needed as is required to coordinate flight operations between multiple aerial vehicles 102 of a group 100, although additional information may be optionally included. For example, when a relatively small communication range 250 (e.g., such as about 500 feet) is selected for each aerial vehicle 102, the full geographic location information (e.g., full latitude, full longitude) and flight characteristics (such as altitude, heading, airspeed, attitude, etc.) of each aerial vehicle is not required to be included in the RF signal 120 transmitted by the aerial vehicle to other aerial vehicles in the same group 100. In the case of an exemplary 500 foot communication range, since one minute of latitude represents over 5000 feet in distance it is not necessary to transmit degrees and minutes of latitude to an aerial vehicle that is less than 500 feet away. Rather, only seconds of latitude and longitude may be included in RF signal 120 until beyond 85 degrees of latitude (at the top or bottom of the world) where minutes of longitude may be required. However, this is not of typical concern since the boundary of the arctic circle is at about 66 degrees latitude.

As an example, in an embodiment in which degrees and minutes of latitude and longitude are ignored, it is possible to get overlapping signals between aerial vehicles that are a mile away or more, depending on signal strength of transmitted signals 120. However, free space path loss characteristics of a particular type of transmitted signal 120 may be taken advantage of to prevent interference problems between aerial vehicles 102 that are within overlapping signal transmission range, but that are otherwise outside each other's sphere of safety (or concern). For example, a 2.4 GHz transmitted signal 120 will have approximately 104 db of free space path loss at a distance of about one mile. This free space path loss may be used to limit the effective communication range of the aerial vehicles 102 of a given group 100 so as to substantially eliminate interference from presenting a problem from other aerial vehicle/s which are in the local area of group 100, but that are otherwise separated from group 100 by a distance sufficiently large enough to place these other aerial vehicles outside the sphere of safety (or concern) of the aerial vehicles of group 100.

Referring again to FIG. 1, synchronization for transmission of RF signals 120 between aerial vehicles 102 is provided by the 1 pulse per second (pps) signal simultaneously generated by the GPS receiver 112 of each aerial vehicle 102 of group 100. A 1 pps GPS signal pulse will be used herein to describe embodiments of the disclosed systems and methods. However, it will be understood that any other suitable type of synchronized clock pulse may be used to provide synchronization for transmission of RF signals 120 between aerial vehicles 102 or other types of entities. Examples of other types of synchronized clock pulses include, but are not limited to, synchronized clock pulses provided by cesium clock circuits or other types of high accuracy clock circuits suitable for synchronously providing a clock pulse at each one of two or more entities (e.g., which may be provided in one embodiment as on-board circuitry of each of said entities), etc.

Using the 1 pps signal for synchronization, the RF transmitter 114 of each aerial vehicle 102 transmits RF signal 120 as a periodic short carrier (e.g., once per second) to other aerial vehicles 102 that is based on the GPS 1 pps signal. As described further below, the precise transmission time of the periodic short carrier relative to the 1 pps GPS signal may be used to communicate the latitude and longitude information for the transmitting aerial vehicle 102 to the receiving aerial vehicles 102. Further, the frequency of a tone placed on a carrier of RF signal 120 of a transmitting aerial vehicle 102 may be optionally used (e.g., modulated) to encode additional geographic location and/or flight characteristic information (e.g., such as altitude and directional heading) of the transmitting aerial vehicle 102 for transmittal to the receiving aerial vehicles 102. In such an embodiment, aerial vehicles that are in very close proximity (e.g., within a distance of less than or equal to about 500 feet of each other) should be aware of each other based on previous transmissions of RF signals 102.

In one exemplary embodiment, a time resolution of 1/3600 of a second may be used to encode the latitude and longitude into a time to transmit of 278 μS, although it will be understood that other time resolutions and transmit times may be employed in the practice of the disclosed systems and methods. Table 1 illustrates geographic location and transmit time data for an example implementation in which eighteen aerial vehicles 102 (in this case UAVs) are flying in a group 100, with each UAV transmitting n RF signal 120 to the other 17 UAVs of the group 100. In this embodiment, each UAV transmits its respective RF signal 120 using a transmit time that communicates its geographic location characteristics (in this case longitude and latitude) to the other 17 UAVs in the group 100. To illustrate, Table 1 shows latitude and longitude geographic location data for each of the UAVs 102 at a given instance of time, and shows distance of each UAV from UAV no. 8 at this instance of time.

Still referring to Table 1, GPS/flight data processing 202 of each UAV receives real time geographic location information (current latitude and longitude for the UAV) from its GPS receiver 112, and then uses this information to calculate a latitude time component and a longitude time component for the UAV as shown in Table 1. In this exemplary embodiment, latitude time component for each UAV is calculated by dividing the latitude second value by a value of 60, and longitude time component for each UAV is calculated by dividing the longitude second value by a value of 3600. The latitude and longitude time components for each given UAV are then summed to produce a total time component for the given UAV. Thus, the total time component for each UAV is a value that is based on both current latitude and current longitude values for the UAV.

It will be understood that the values of 60 and 3600 employed for the previous embodiment are exemplary, and that any other value/s, mathematical operators or combinations thereof suitable for calculating a latitude time component and a longitude time component may be employed. For example, latitude time component for each UAV may be alternatively calculated by dividing the latitude second value by an integer or non-integer value of greater than 60 (e.g., by a value of 61, 62, 63, 70, etc.) or by an integer or non-integer value that is less than 60 (e.g., by a value of 59, 58, 57, 50, etc.), it being understood that greater values may be employed to yield greater resolution and that lesser values may be employed to yield lesser resolution. Similarly, longitude time component for each UAV may be calculated by dividing the longitude second value by an integer or non-integer value of greater than 3600 (e.g., by a value of 3601, 3602, 3603, 3900, 4200, 4900, etc.) or by an integer or non-integer value that is less than 3600 (e.g., by a value of 3599, 3598, 3597, 3300, 3000, 2300, etc.). Moreover, the particular mathematic operators employed for calculating the time delay of a pulsed RF signal relative to the 1 pps GPS signal in order to encode geographic location information for transmittal from one aerial vehicle to another aerial vehicle, and to decode geographic location information from the time delay of a received pulsed RF signal relative to the 1 pps GPS signal may vary. For example, longitude and latitude components

TABLE 1

| UAV No. | UAV Latitude (from GPS) | | | UAV Longitude (from GPS) | | | Distance from UAV#8 | Latitude time component (Seconds/60) | Longitude time component (Seconds/3600) | Total time component |
|---|---|---|---|---|---|---|---|---|---|---|
| | Hrs | Mins | Secs | Hrs | Mins | Secs | | | | |
| UAV#1 | 33 | 4 | 15 | 96 | 4 | 10 | 425.07 feet' | 0.25000000 | 0.00277778 | 0.25277778 |
| UAV#2 | 33 | 4 | 13 | 96 | 4 | 19 | 395.98 feet' | 0.21666667 | 0.00527778 | 0.22194444 |
| UAV#3 | 33 | 4 | 15 | 96 | 4 | 11 | 340.05 feet' | 0.25000000 | 0.00305556 | 0.25305556 |
| UAV#4 | 33 | 4 | 12 | 96 | 4 | 21 | 593.98 feet' | 0.20000000 | 0.00583333 | 0.20583333 |
| UAV#5 | 33 | 4 | 9 | 96 | 4 | 18 | 659.96 feet' | 0.15000000 | 0.00500000 | 0.15500000 |
| UAV#6 | 33 | 4 | 16 | 96 | 4 | 15 | 101.45 feet' | 0.26666667 | 0.00416667 | 0.27083333 |
| UAV#7 | 33 | 4 | 15 | 96 | 4 | 16 | 85.01 feet' | 0.25000000 | 0.00444444 | 0.25444444 |
| UAV#8 | 33 | 4 | 15 | 96 | 4 | 15 | 0.00 feet' | 0.25000000 | 0.00416667 | 0.25416667 |
| UAV#9 | 33 | 4 | 14 | 96 | 4 | 15 | 101.45 feet' | 0.23333333 | 0.00416667 | 0.23750000 |
| UAV#10 | 33 | 4 | 15 | 96 | 4 | 14 | 85.01 feet' | 0.25000000 | 0.00388889 | 0.25388889 |
| UAV#11 | 33 | 4 | 11 | 96 | 4 | 13 | 439.97 feet' | 0.18333333 | 0.00361111 | 0.18694444 |
| UAV#12 | 33 | 4 | 18 | 96 | 4 | 7 | 745.09 feet' | 0.30000000 | 0.00194444 | 0.30194444 |
| UAV#13 | 33 | 4 | 17 | 96 | 4 | 26 | 956.90 feet' | 0.28333333 | 0.00722222 | 0.29055556 |
| UAV#14 | 33 | 4 | 12 | 96 | 4 | 12 | 397.08 feet' | 0.20000000 | 0.00333333 | 0.20333333 |
| UAV#15 | 33 | 4 | 12 | 96 | 4 | 21 | 593.98 feet' | 0.20000000 | 0.00583333 | 0.20583333 |
| UAV#16 | 33 | 4 | 21 | 96 | 4 | 18 | 659.96 feet' | 0.35000000 | 0.00500000 | 0.35500000 |
| UAV#17 | 33 | 4 | 17 | 96 | 4 | 20 | 471.01 feet' | 0.28333333 | 0.00555556 | 0.28888889 |
| UAV#18 | 33 | 4 | 18 | 96 | 4 | 14 | 315.99 feet' | 0.30000000 | 0.00388889 | 0.30388889 | may be multiplied by fractional values to calculate respective latitude time components and a longitude time components may be employed.

Figure 3:
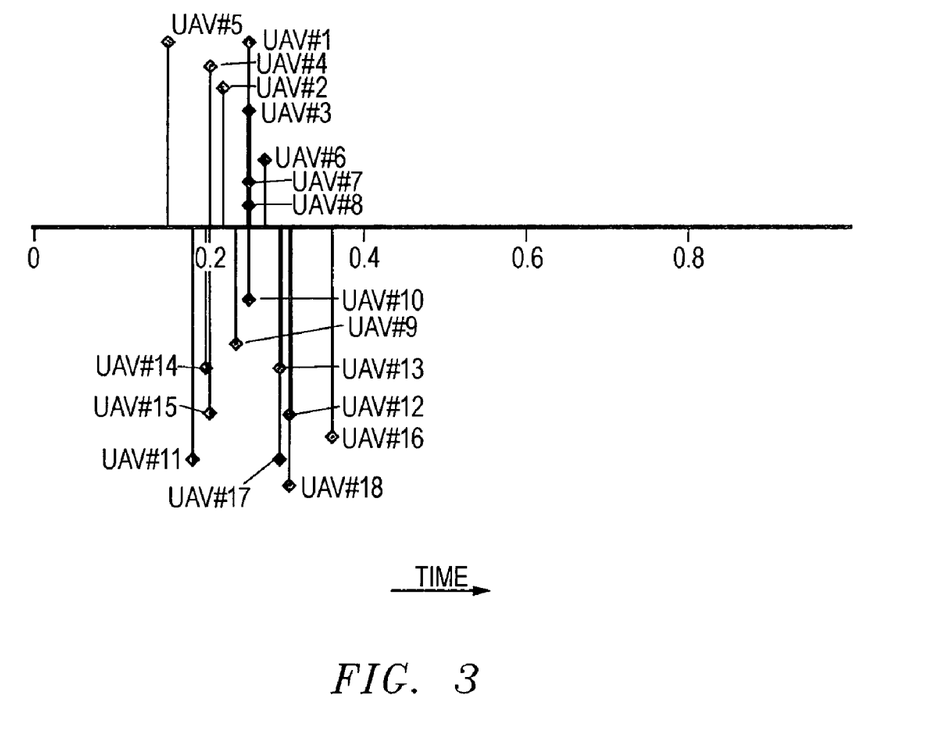
FIG. 3 is a graphical representation (timeline) of unique transmit time utilization according to one exemplary embodiment of the disclosed systems and methods.

FIG. 3 illustrates unique transmit time utilization based on the UAV positions indicated in Table 1. In particular, FIG. 3 is a timeline of UAV transmission unique transmit times using the geographic location and transmit time data of Table 1. In FIG. 3, each UAV transmission is indicated by a vertical line that is labeled with the identity of the transmitting UAV number. The time of each UAV transmission is indicated by its position relative to the x-axis, which represents time from the GPS 1 pps signal transmit time, with a time value of 0 occurring at a first 1 pps signal transmit time, and a time value of 1 occurring at a second and next 1 pps signal transmit time. The total time component of Table 1 is used to determine the transmit time of each UAV relative to the GPS 1 pps signal transmit time, and assigned unique transmit times for radio transmission by each of the aerial vehicles are not required. Thus the transmit time for UAV1 occurs at 0.25277778 of a second after the GPS 1 pps signal transmit time, the transmit time for UAV2 occurs at 0.22194444 of a second after the GPS 1 pps signal transmit time, the transmit time for UAV5 occurs at 0.15500000 of a second after the GPS 1 pps signal transmit time, etc.

Figure 4:
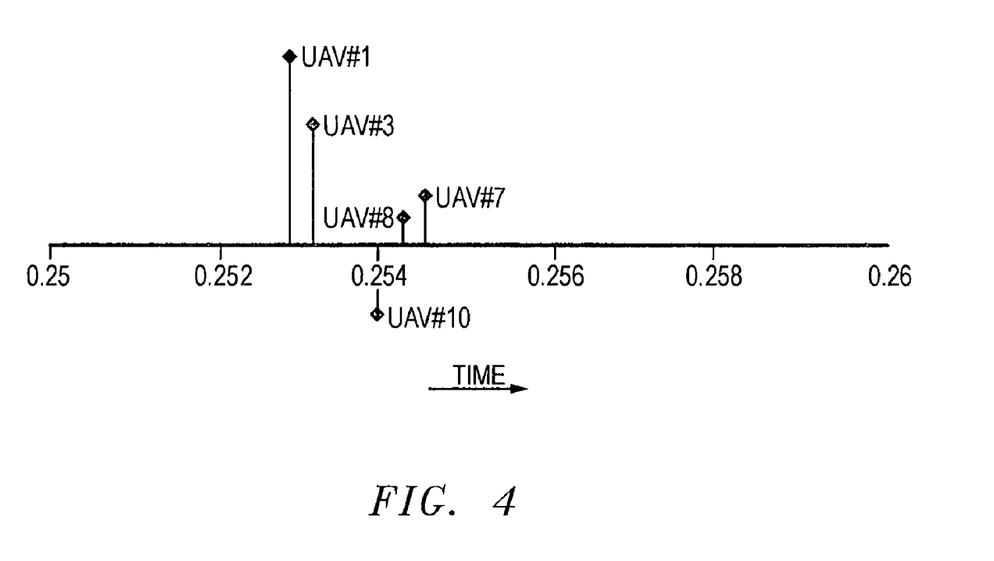
FIG. 4 is a graphical representation (timeline) of unique transmit time utilization according to one exemplary embodiment of the disclosed systems and methods.

In FIG. 3, the relative length of each vertical line along the y-axis has no meaning. While it may appear in FIG. 3 that UAV1, UAV3, UAV7, UAV8 and UAV10 all transmit at the same time, this is not true. A more detailed view of the timeline of FIG. 3 (i.e., showing from 0.25 to 0.25 of a second after the GPS 1 pps signal transmit time) is shown in FIG. 4, from which it may be seen that each UAV has its own unique transmit time.

Figure 5:
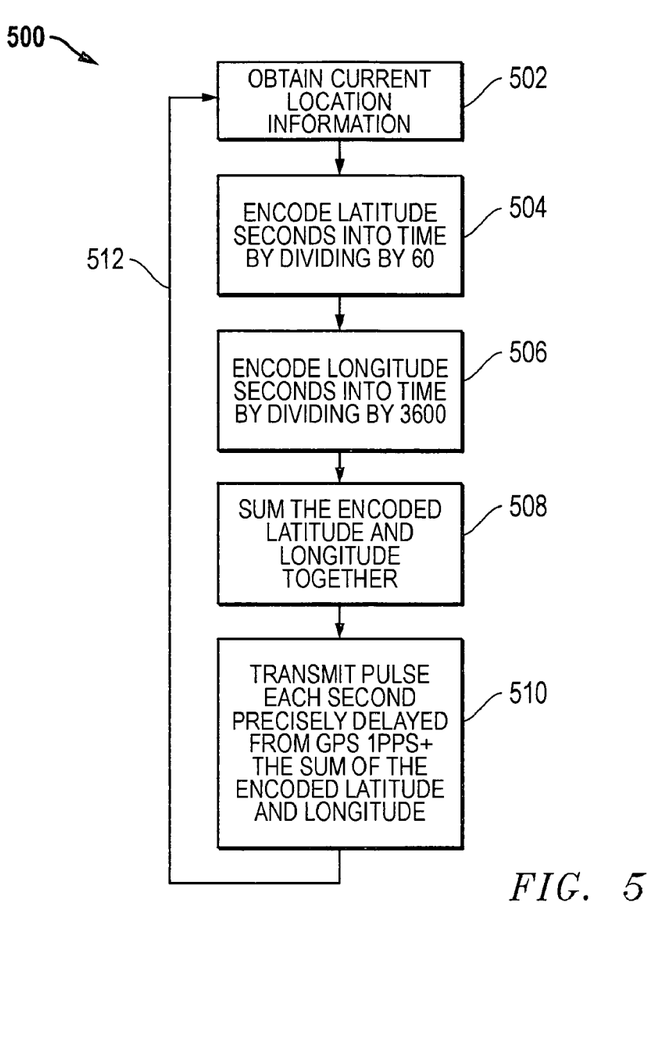
FIG. 5 is a flowchart showing methodology for encoding and transmitting geographic location information according to one exemplary embodiment of the disclosed systems and methods.

FIG. 5 shows exemplary methodology 500 of one embodiment that may be implemented (e.g., by GPS/flight data processing 202 of a given aerial vehicle 102) to encode real time geographic location information in the form of latitude and longitude for transmittal in a timed RF signal pulse 120 from the given aerial vehicle 102 to one or more other aerial vehicles 102. As shown, methodology 500 starts in step 502 where current real time geographic location information (current latitude and longitude for the given aerial vehicle) is obtained (e.g., from its GPS receiver 112) periodically, e.g., obtained each second. This geographic location information is used in step 504 to encode latitude seconds into a time component by dividing the latitude seconds of the current position by a value of 60, and in step 506 to encode longitude seconds into a time component by dividing the longitude seconds of the current position by a value of 3600. The encoded latitude and longitude time components are then summed in step 508 to produce a total time component for the given aerial vehicle 120. A RF signal 120 is then transmitted in step 510 (e.g., by RF transceiver 204) from the given aerial vehicle 102 to other aerial vehicle/s 102 as a pulse that is delayed relative to a pulse of the GPS 1 pps signal by the time component computed in step 508. As an example, Table 1 shows the total time component that may be calculated for each UAV of a given group 100, based on its current latitude and longitude at the time of a given 1 pps pulse. This total time component represents the time delay for transmission of the RF signal pulse from each UAV after the corresponding 1 pps pulse. As shown in FIG. 5 by arrow 512, steps 502 through 510 are repeated, e.g., repeated once each second (e.g., so that a RF signal pulse is transmitted between each pair of 1 pps GPS signals) or repeated once any other suitable time period for a given embodiment.

Figure 6:
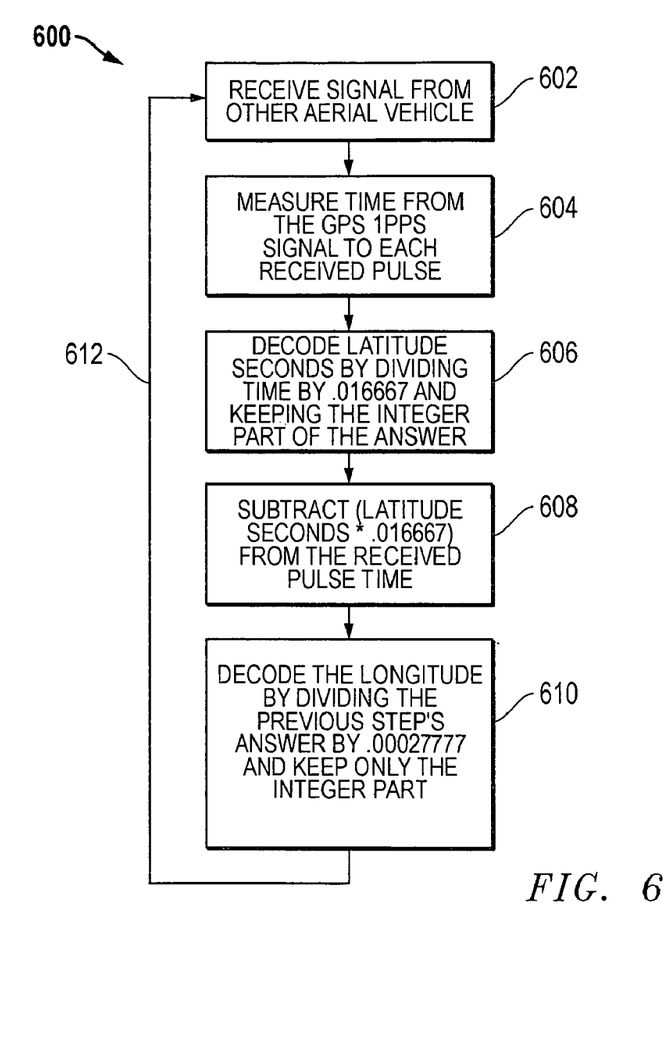
FIG. 6 is a flowchart showing methodology for receiving and decoding geographic location information according to one exemplary embodiment of the disclosed systems and methods.

FIG. 6 shows exemplary methodology 600 of one embodiment that may be implemented (e.g., by flight control processing 203a of a given aerial vehicle 102) to decode real time geographic location information in the form of latitude and longitude received in a given timed RF signal pulse 120 from another aerial vehicle 102, e.g., that is operating in the same group 100. As shown, methodology 600 starts in step 602 where the given RF signal 120 is received as a periodic RF transmission pulse from another aerial vehicle 102, e.g., that is received as pulse transmitted once per each second period. In step 604, the total time component (time delay) from the most recent GPS 1 pps signal to the time of the given received RF signal pulse is measured and then latitude seconds represented by the given received RF signal pulse is decoded in step 606 by dividing the time difference by 0.016667 (i.e., reciprocal of the factor of 60 by which latitude seconds was divided in step 504) and keeping the integer portion of the result which represents seconds of latitude. As an example, the first time entry in Table 1 is 0.25277778, which may be divided by 0.016667 to obtain a result of 15.16636347 .... The integer portion of this result is 15, which corresponds to 15 seconds of latitude.

Still referring to FIG. 6, the calculated latitude (e.g., 15 in the current example of the previous paragraph) is multiplied by 0.016667 (i.e., reciprocal of the factor of 60 by which latitude seconds were divided in step 504) and then subtracted from total time component (time delay) of the given received RF signal pulse (e.g., 0.25277778 in this example) in step 608 to yield a value (e.g., 0.00277778), that is then divided in step 610 by 0.000277778 (i.e., reciprocal of the factor of 3600 by which longitude seconds was divided in step 506). The integer value of the result obtained in step 610 is kept and represents longitude seconds. For the first time entry of Table 1, this corresponds to 10 seconds of longitude. As shown in FIG. 6 by arrow 612, steps 602 through 610 are repeated, e.g., repeated once each second (e.g., so that a RF signal pulse is received between each pair of 1 pps GPS signals) or any other suitable time period for a given embodiment.

It will be understood that the methodology of FIGS. 5 and 6 is exemplary only and that additional, fewer and/or alternative steps may be employed for encoding geographic location information for transmittal by a timed RF signal pulse from a given aerial vehicle to one or more other aerial vehicles, and/or for decoding geographic location information received by a given aerial vehicle as a timed RF signal pulse from another aerial vehicle. Furthermore, the specific mathematic factors (and reciprocals thereof) and/or operators employed for calculating the time delay of a pulsed RF signal relative to the 1 pps GPS signal in order to encode geographic location information for transmittal from one aerial vehicle to another aerial vehicle, and to decode geographic location information from the time delay of a received pulsed RF signal relative to the 1 pps GPS signal may vary.

For example, it is not necessary that both longitude and latitude information be communicated by a pulsed RF signal. Rather it is possible that only one of latitude or longitude be communicated by the time delay of a pulsed RF signal, e.g., by basing the time delay relative to the 1 pps GPS signal on only a latitude time component or only a longitude time component. Alternatively, longitude and latitude information may be communicated by respective alternative pulsed RF signals, e.g., by basing the time delay of a first pulsed RF signal relative to a first 1 pps GPS signal on only a latitude time component, followed by basing the time delay of a second pulsed RF signal relative to a second 1 pps GPS signal on only a longitude time component, and then repeating this process so that both latitude and longitude information for a given aerial vehicle is transmitted every two pulsed RF signals and every two 1 pps GPS signals. In another alternative, multiple RF signal pulses may be transmitted by an aerial vehicle after each 1 pps GPS signal (and before the next 1 pps GPS signal), with each pulse having a respective time delay relative to the preceding 1 pps GPS signal. For example, latitude may be encoded by the time delay of a first RF signal pulse and longitude may be encoded by the time delay of a second RF signal pulse following the same 1 pps GPS signal. Further alternatively, seconds of latitude and longitude may be encoded and communicated by the time delay of a first RF signal pulse relative to the 1 pps GPS signal, and minutes of latitude and longitude may be encoded and communicated by the time delay of a second RF signal pulse relative to the same 1 pps GPS signal, etc.

In embodiments where only one of latitude or longitude is encoded by the time delay of a given pulsed RF signal, it is possible that simultaneous transmission events (e.g., crosstalk) may occur where two or more aerial vehicles are positioned at the same latitude (e.g., but at different longitude) or are positioned at the same longitude (e.g., but at different latitude), depending on which of latitude or longitude value is encoded in the pulsed RF signal. In these or any other cases where such cross talk interference is detected, the given RF signal pulse may be ignored in one exemplary embodiment by the receiving aerial vehicle in favor of the next RF signal pulse following the given RF signal pulse that is subject to cross talk. Successive RF signal pulses may be ignored in the same way until a RF signal pulse is received that is free of cross talk.

As described above, each aerial vehicle 102 of a group of aerial vehicles 100 may be kept aware of one or more geographic location and/or flight characteristic information of one or more other adjacent aerial vehicles 102 within the same group 100. However, it will be understood that the disclosed systems and methods may be used to enable a first aerial vehicle 102 to be kept aware of one or more geographic location and/or flight characteristic information of at least one second aerial vehicle 102 operating within close proximity of the first aerial vehicle, whether or not the first and second aerial vehicles 102 are operating within the same group 100 of aerial vehicles.

In one embodiment, an aerial vehicle may adjust its flight behavior based on situational awareness of the airspace around it. For example, a first aerial vehicle 102 may use the received geographic location and/or flight characteristics information of at least one second aerial vehicle 102 to adjust its flight path to maintain a safety sphere of empty airspace around itself relative to the at least one second aerial vehicle 102. In another embodiment, each of the first and second aerial vehicles 102 may use received geographic location and/or flight characteristics information of the other aerial vehicle 102 to adjust flight paths (e.g., take evasive action) to facilitate coordinated flight operations and avoid collision between the first and second aerial vehicles 102 in a manner that substantially reduces or eliminates the potential for mid-air collisions between two or more of the aerial vehicles 102.

In the practice of the disclosed systems and methods, any suitable flight coordination protocol may be implemented (e.g., by flight control processing 203 of flight coordination system 200 on each of the aerial vehicles 102) to provide effective de-confliction of flight paths of first and second aerial vehicles 102 on a real-time or near real-time basis. However, one exemplary embodiment of rule-based flight coordination protocol may be implemented the following exemplary rules.

One exemplary rule that may be implemented is for a given airborne aerial vehicle 102 to seek un-congested air space whenever possible by basing its short term course corrections on vectors that take it away from its nearest neighboring airborne vehicles 102. For example, referring again to the group 100 of airborne aerial vehicles shown from overhead view in FIG. 1, aerial vehicles 102b and 102c are shown operating as nearest neighbors adjacent to each other at substantially similar altitudes, with the remainder of aerial vehicles 102 of group 100 operating substantially further away from each of aerial vehicles 102b and 102c. Each of aerial vehicles 102b and 102c will therefore make course corrections that will take it away from its nearest neighbor and into a more uncongested airspace within the group, e.g., aerial vehicle 102b may increase its altitude and temporarily alter its heading to the vector shown by arrow 190 to take it laterally away from aerial vehicle 102c and aerial vehicle 102c may decrease its altitude and temporarily alter its heading to the vector shown by arrow 192 to take it laterally away from aerial vehicle 102b while at the same time increase its altitude separation from aerial vehicle 102d. It will be understood that the foregoing example is exemplary only and that other types of course corrections may be made by each of aerial vehicles 102 to take it away from its nearest neighboring airborne vehicles 102 so as to keep each aerial vehicle in a position that is most uncongested within the airspace of its group 100.

Another exemplary rule may be implemented to direct evasive maneuvers for two aerial vehicles 102 that are heading toward each other, e.g., approaching each other in a head on manner. For example, each aerial vehicle 102 may be directed to gain altitude and turn in direction away from the other (e.g., both may be directed to turn right). Using such a rule, two positive effects may be realized on the situation. First, gaining altitude will translate the kinetic energy of each aerial vehicle into potential energy and enable the aerial vehicle to decrease its air speed and thus decrease the closure rate with the other aerial vehicle. Second, the flight trajectory of the aerial vehicles will slow the convergence or diverge from a mid-air collision path.

It will be understood that the foregoing rules are exemplary only and that other rules and combinations of rules may be employed. Furthermore, higher order algorithms may be implemented (e.g., by flight control processing 203 of flight coordination system 200 on each of the aerial vehicles 102) to de-conflict the air space using geographic location and/or flight characteristics of aerial vehicle 102 (e.g., provided by GPS/flight data processing 202) and geographic location and/or flight characteristics of at least one other aerial vehicle 102 (e.g., provided in received RF signal 102).

It will also be understood that although the given examples are described herein with regard to communicating geographic location information between aerial vehicles and coordination of operation of the same, the disclosed systems and methods may alternatively be employed for communicating geographic location information between any two or more entities positioned or operating on land, sea or air, including between vehicles of other types (e.g., ships, automobiles, military vehicles, trucks, etc.), humans, buildings, etc. and coordination of operations of same. Furthermore, such geographic location information may be communicated between entities of different types, e.g., between an aerial vehicle and a land based building or mobile vehicle such as ship or truck. Additionally, other information (e.g., such as directional course of motion) may be simultaneously communicated between such entities at the same time, e.g. using modulated carrier tone as previously described.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method for coordinating operations of a group of two or more entities, said method comprising:

communicating location information derived from global positioning system (GPS) data corresponding to the geographic location of a first one of said entities of said group to at least a second one of said entities of said group by transmitting a RF signal pulse from said first entity to said second entity at a time delayed relative to a time of a provided first synchronized clock pulse, the value of said time delay being based on said location information;

determining said geographic location of said first one of said entities of said group based on said time delay value determined from said RF signal pulse received by said second one of said entities of said group; and controlling a directional path of at least said second one of said entities of said group based at least partially on said determined geographic location of said first one of said entities of said group relative to the geographic location of said second one of said entities of said group.

2. The method of claim 1, wherein each of said entities comprises an aerial vehicle; wherein said first synchronized clock pulse comprises a 1 pps global positioning system (GPS) signal pulse received at said first one of said aerial vehicles; and wherein said method comprises controlling a flight path of at least said second one of said aerial vehicles of said group based at least partially on said determined geographic location of said first one of said aerial vehicles of said group relative to the geographic location of said second one of said aerial vehicles of said group.

3. The method of claim 2, further comprising:

communicating location information corresponding to the geographic location of each of said aerial vehicles of said group to each other of said aerial vehicles of said group by transmitting a RF signal pulse from each of said aerial vehicles to each other of said aerial vehicles at a time delayed relative to a time of a 1 pps GPS signal pulse received at each of said aerial vehicles, the value of said time delay of each of said transmitted RF signal pulses being based on location information corresponding to the geographic location of the aerial vehicle from which said RF signal pulse is transmitted; and determining said geographic location of each of said aerial vehicles of said group based on said time delay value determined from said RF signal pulse received from each of said aerial vehicles of said group by each other of said entities of said group; and controlling a flight path of each of said aerial vehicles of said group based at least partially on said determined geographic locations of each of said other aerial vehicles of said group relative to the geographic location of said aerial vehicle having a flight path being so controlled;

wherein said RF signal pulse transmitted from each of said aerial vehicles is transmitted on the same RF signal carrier frequency as said RF signal pulses transmitted from each other of said aerial vehicles.

4. The method of claim 3, wherein each of said aerial vehicles of said group is an unmanned aerial vehicle; and wherein said method further comprises flying said group of said unmanned aerial vehicles in an autonomous manner by said step of controlling a flight path of each of said aerial vehicles of said group based at least partially on said determined geographic locations of each of said other aerial vehicles of said group.

5. The method of claim 3, further comprising using a rule-based flight coordination protocol to control a flight path of each of said aerial vehicles of said group based at least partially on said determined geographic locations of each of said other aerial vehicles of said group.

6. The method of claim 3, wherein said step of controlling comprises controlling a flight path of each of said aerial vehicles of said group to maintain a sphere of empty airspace around each of said aerial vehicles based at least partially on said determined geographic locations of each of said other aerial vehicles of said group.

7. The method of claim 2, further comprising receiving GPS satellite signal transmissions at said first and second aerial vehicles of said group at a first time, said GPS satellite signal transmissions comprising said 1 pps GPS signal pulse;

determining said geographic location of said first one of said aerial vehicles of said group from said GPS satellite signal transmissions, said geographic location comprising a latitude value and a longitude value corresponding to said geographic location of said first one of said aerial vehicles of said group;

transmitting said RF signal pulse from said first aerial vehicle to said second aerial vehicle at a time delayed relative to a time said 1 pps GPS signal pulse is received at said first one of said aerial vehicles, the value of said time delay being based on said latitude and longitude values corresponding to said geographic location of said first one of said aerial vehicles of said group;

determining said time delay value of said RF signal pulse from said first aerial vehicle based on a time said RF signal pulse is received at said second aerial vehicle relative to a time said 1 pps GPS signal is received at said second aerial vehicle;

determining said latitude and longitude values corresponding to said geographic location of said first one of said aerial vehicles of said group based on said time delay value determined from said received RF signal pulse; and controlling a flight path of at least said second one of said aerial vehicles of said group based at least partially on said determined latitude and longitude values corresponding to said geographic location of said first one of said aerial vehicles of said group.

8. The method of claim 2, wherein said first synchronized clock pulse comprises a first 1 pps global positioning system (GPS) signal pulse, and wherein said method further comprises:

receiving GPS satellite signal transmissions at said first aerial vehicle at a first time, said GPS satellite signal transmissions comprising said first 1 pps GPS signal pulse;

obtaining said location information by determining latitude and longitude values of a geographic location of said first aerial vehicle at said first time from said GPS satellite signal transmissions received at said first time; and transmitting a first RF signal pulse from said first aerial vehicle at a time delayed relative to said first time that said first 1 pps GPS signal pulse is received, the value of said time delay being based on said latitude and longitude values of said determined geographic location of said first aerial vehicle at said first time.

9. The method of claim 8, further comprising:
receiving a second RF signal pulse from said second aerial vehicle at said first aerial vehicle;
determining said time delay value of said received second RF signal pulse based on a time said second RF signal pulse is received at said first aerial vehicle relative to a time said first 1 pps GPS signal is received at said first aerial vehicle;
determining said latitude and longitude values of said geographic location of said at least one second aerial vehicle at said first time based on said value of said time delay that is determined based on a time said second RF signal pulse is received at said first aerial vehicle relative to a time said first 1 pps GPS signal is received at said first aerial vehicle; and
controlling a flight path of said first aerial vehicle based at least partially on said determined latitude and longitude values of said geographic location of said second aerial vehicle at said first time relative to latitude and longitude values of said geographic location of said first aerial vehicle at said first time.

10. The method of claim 8, further comprising:
dividing or multiplying the seconds value of said latitude value of said geographic location of said first aerial vehicle at said first time by a first factor to obtain a first latitude time component, and dividing or multiplying the seconds component of said longitude value of said geographic location of said first aerial vehicle at said first time by a second factor to obtain a first longitude time component;
summing said first latitude time component and said first longitude time component together to obtain a first total time component; and
determining said time delay value by setting said time delay to be equal to said first total time component.

11. The method of claim 8, further comprising:
receiving GPS satellite signal transmissions at said first aerial vehicle at a second time later than said first time, said GPS satellite signal transmissions comprising a second 1 pps GPS signal pulse;
determining latitude and longitude values of a geographic location of said first aerial vehicle at said second time from said GPS satellite signal transmissions received at said second time; and
transmitting a second RF signal pulse from said first aerial vehicle at a time delayed relative to said second time that said second 1 pps GPS signal pulse is received, the value of said time delay being based on said latitude and longitude values of said determined geographic location of said first aerial vehicle at said second time.

12. The method of claim 11, further comprising: receiving said second RF signal pulse from said first aerial vehicle at said second aerial vehicle;
determining said time delay value of said received second RF signal pulse based on a time said second RF signal pulse is received at said second aerial vehicle relative to a time said second 1 pps GPS signal is received at said second aerial vehicle; and
determining said latitude and longitude values of said geographic location of said first aerial vehicle at said second time based on said value of said time delay that is determined based on a time said second RF signal pulse is received from said first aerial vehicle at said second aerial vehicle relative to a time said second 1 pps GPS signal is received at said second aerial vehicle.

13. The method of claim 8, further comprising:
receiving global positioning system (GPS) satellite transmissions at said second aerial vehicle at said first time, said GPS satellite signal transmissions comprising said first 1 pps GPS signal pulse;
determining latitude and longitude values of a geographic location of said second aerial vehicle at said first time from said GPS satellite signal transmissions received at said first time;
transmitting a first RF signal pulse from said second aerial vehicle at a time delayed relative to said first time that said first 1 pps GPS signal pulse is received, the value of said time delay being based on said latitude and longitude values of said determined geographic location of said second aerial vehicle at said first time; and
transmitting said first RF signal pulse from said second aerial vehicle at the same RF signal carrier frequency that said first RF signal pulse is transmitted from said first aerial vehicle.

14. The method of claim 13, further comprising:
receiving said first RF signal pulse transmitted by said first aerial vehicle at said second aerial vehicle;
determining said time delay value of said first RF signal pulse received from said first aerial vehicle based on a time said first RF signal pulse from said first aerial vehicle is received at said second aerial vehicle relative to a time said first 1 pps GPS signal is received at said second aerial vehicle;
determining said latitude and longitude values of said geographic location of said first aerial vehicle at said first time based on said value of said time delay that is determined based on a time said first RF signal pulse from said first aerial vehicle is received at said second aerial vehicle relative to a time said first 1 pps GPS signal is received at said second aerial vehicle;
receiving said first RF signal pulse transmitted by said second aerial vehicle at said first aerial vehicle;
determining said time delay value of said first RF signal pulse received from said second aerial vehicle based on a time said first RF signal pulse from said second aerial vehicle is received at said first aerial vehicle relative to a time said first 1 pps GPS signal is received at said first aerial vehicle;
determining said latitude and longitude values of said geographic location of said second aerial vehicle at said first time based on said value of said time delay that is determined based on a time said first RF signal pulse from said second aerial vehicle is received at said first aerial vehicle relative to a time said first 1 pps GPS signal is received at said first aerial vehicle; and
controlling a flight path of said second aerial vehicle based at least partially on said determined latitude and longitude values of said geographic location of said first aerial vehicle at said first time relative to latitude and longitude values of said geographic location of said second aerial vehicle at said first time; and controlling a flight path of said first aerial vehicle based at least partially on said determined latitude and longitude values of said geographic location of said second aerial vehicle at said first time relative to latitude and longitude values of said geographic location of said first aerial vehicle at said first time.

15. The method of claim 8, further comprising obtaining flight characteristic information of said first aerial vehicle; and encoding said first RF signal pulse with said flight characteristic information prior to transmitting said first RF signal pulse from said first aerial vehicle.

16. A system for communicating location information, comprising:
   at least one processing component coupled to a transmitter, said transmitter being configured to transmit a first RF signal pulse;
   wherein said at least one processing component is configured to:
      obtain first location information from global positioning system (GPS) data, said first location information comprising at least one value corresponding to a first geographic location,
      determine a time delay value based on said at least one value of said location information corresponding to said first geographic location, and
      provide a signal to said transmitter to cause transmission of said first RF signal pulse at a time delayed relative to a time that a first synchronized clock pulse is produced, the value of said time delay being based on said at least one value of said first location information corresponding to said first geographic location
      wherein said system is configured for use as a component of a first entity and wherein said system of said first entity further comprises:
   a receiver coupled to said at least one processing component, said receiver being configured to receive a second RF signal pulse from at least one second entity, the second RF signal pulse being transmitted at a time delayed relative to a time that a first synchronized clock pulse is produced, the value of said time delay being based on a geographic location of said at least one second entity;
   wherein said at least one processing component of said first entity is further configured to determine the geographic location of said at least one second entity based on said time delay value determined from said second RF signal pulse received by said first entity; and
   wherein said at least one processing component of said first entity is further configured to control a directional path of at least said first entity based at least partially on said determined geographic location of said second entity relative to the geographic location of said first entity.

17. The system of claim 16,
   wherein said at least one processing component of said first entity is further configured to:
   determine a time delay value of said second RF signal pulse based on a time said second RF signal pulse is received from said second entity by said receiver of said first entity relative to a time said first synchronized clock pulse is provided; and
   determine a second geographic location of said second entity based on a value of said time delay value of said second RF signal;
   wherein said first and second RF signal pulses have the same RF signal carrier frequency.

18. The system of claim 16, wherein said synchronized clock pulse comprises a 1 pps global positioning system (GPS) signal pulse; wherein said system comprises a component of a first aerial vehicle and further comprises a GPS receiver coupled to said at least one processing component; wherein said GPS receiver is configured to receive GPS satellite signal transmissions at a first time, said GPS satellite signal transmissions comprising said first 1 pps GPS signal pulse; and wherein said at least one processing component is configured to:
   obtain said first location information by determining latitude and longitude values of a geographic location of said first aerial vehicle at said first time from said GPS satellite signal transmissions received at said first time by said GPS receiver; and
   provide a signal to said transmitter to cause transmission of said first RF signal pulse from said first aerial vehicle at a time delayed relative to said first time that said first 1 pps GPS signal pulse is received, the value of said time delay being based on said latitude and longitude values of said determined geographic location of said first aerial vehicle at said first time.

19. The system of claim 18, wherein said at least one processing component is further configured to:
   divide or multiply the seconds value of said latitude value of said geographic location of said first aerial vehicle at said first time by a first factor to obtain a first latitude time component, and to divide or multiply the seconds component of said longitude value of said geographic location of said first aerial vehicle at said first time by a second factor to obtain a first longitude time component;
   sum said first latitude time component and said first longitude time component together to obtain a first total time component; and
   determine said time delay value by setting said time delay to be equal to said first total time component.

20. The system of claim 18, further comprising:
   a receiver coupled to said at least one processing component of said first aerial vehicle, said receiver being configured to receive a second RF signal pulse from at least one second aerial vehicle;
   wherein said at least one processing component of said first aerial vehicle is further configured to:
      determine a time delay value of said second RF signal pulse based on a time said second RF signal pulse is received by said receiver relative to said first time said first 1 pps GPS signal is received; and
      determine latitude and longitude values of a geographic location of said at least one second aerial vehicle at said first time based on said value of said time delay that is determined based on a time said second RF signal pulse is received at said first aerial vehicle relative to said first time said first 1 pps GPS signal is received; and
   wherein said system further comprises at least one processing component configured to provide flight control command signals to control a flight path of said first aerial vehicle based at least partially on said determined latitude and longitude values of said geographic location of said at least one second aerial vehicle at said first time relative to said latitude and longitude values of said geographic location of said first aerial vehicle at said first time.

21. The system of claim 20, wherein said at least one processing component is configured to provide flight control command signals to control a flight path of said first aerial vehicle is further configured to use a rule-based flight coordination protocol to control a flight path of said first aerial vehicle based at least partially on said determined latitude and longitude values of said geographic location of said at least one second aerial vehicle at said first time relative to said latitude and longitude values of said geographic location of said first aerial vehicle at said first time.

22. The system of claim 20, wherein said at least one processing component is configured to provide flight control command signals to control a flight path of said first aerial vehicle is further configured to control a flight path of said first aerial vehicle to maintain a sphere of empty airspace around said first aerial vehicle based at least partially on said determined latitude and longitude values of said geographic location of said at least one second aerial vehicle at said first time relative to said latitude and longitude values of said geographic location of said first aerial vehicle at said first time.

23. The system of claim 16, further comprising at least one processing component configured to obtain flight characteristic information of said first aerial vehicle and to provide a signal to said transmitter to cause transmission of said first RF signal pulse from said first aerial vehicle such that said first RF signal pulse is encoded with said flight characteristic information.

24. A method for controlling a directional path of a first entity, the method comprising:

receiving at the first entity a RF signal pulse transmitted from a second entity at a time delayed relative to a time of a provided synchronized clock pulse, the value of said time delay being based on the geographic location of the second entity;

determining said geographic location of said second entity based on said time delay value determined from said RF signal pulse received by said first entity; and controlling a directional path of said first entity based at least partially on said determined geographic location of said second entity relative to the geographic location of said first entity.

25. A system for controlling a directional path of a first entity, comprising:

at least one processing component;

a receiver coupled to said at least one processing component, said receiver and processing component being configured for use as a component of the first entity;

where the receiver is configured to receive a RF signal pulse from at least one second entity, the second RF signal pulse being transmitted at a time delayed relative to a time that a first synchronized clock pulse is produced, the value of said time delay being based on a geographic location of said at least one second entity;

where said at least one processing component of said first entity is further configured to determine the geographic location of said at least one second entity based on said time delay value determined from said second RF signal pulse received by said first entity; and where said at least one processing component of said first entity is further configured to control a directional path of said first entity based at least partially on said determined geographic location of said second entity relative to the geographic location of said first entity.

* * * * *